May 7, 1929.  F. PURDY ET AL  1,712,460
CARBURETOR
Filed July 25, 1921
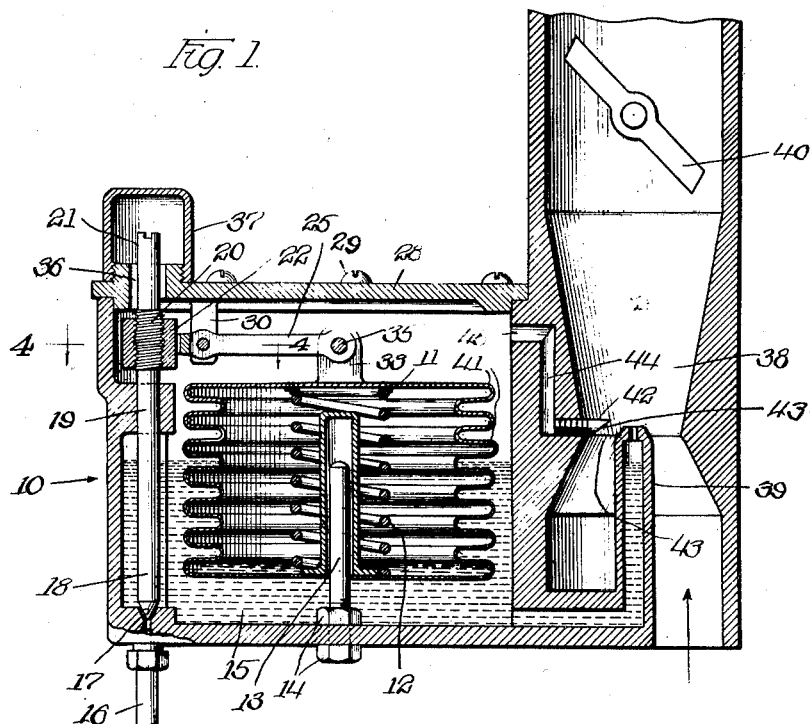
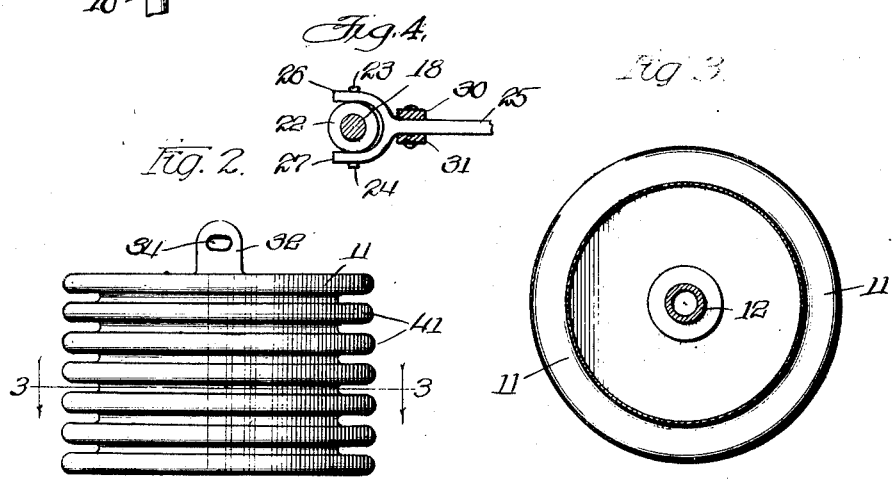
Inventor
Frederick Purdy
Foree Bain
by
Attys Patented May 7, 1929.

1,712,460

UNITED STATES PATENT OFFICE.

FREDERICK PURDY, OF CHICAGO, AND FORÉE BAIN, OF LA GRANGE, ILLINOIS, ASSIGNORS TO PACKARD MOTOR CAR COMPANY, OF DETROIT, MICHIGAN, A CORPORATION OF MICHIGAN.

CARBURETOR.

Application filed July 25, 1921. Serial No. 487,381.

The invention relates to improvements to carburetors.

One of the objects of the invention is to improve carburetors.

Another object is to provide a carburetor which will automatically compensate for variation in temperature of the fuel contents and engine speed.

Other objects and advantages will readily appear from a consideration of the following description when taken in conjunction with the drawings, wherein:—

Fig. 1 is a central, vertical section of a usual type carburetor in which the invention is shown.

Fig. 2 is an elevation of the improved float that controls admission of the liquid fuel into the float chamber to regulate the height of the fuel or liquid level in the chamber.

Fig. 3 is a section taken on line 3—3 of Fig. 2.

Fig. 4 is a section taken on line 4—4 of Fig. 1.

In all the views the same reference characters are employed to indicate similar parts.

In the conventional type of carburetor many features of which have been chosen to illustrate the invention, 10 is the float chamber that is made entirely air-tight except for a vent leading into the Venturi tube, or air conduit.

An axially expansible float 11, of bellows form, is closed and hermetically sealed. It has been exhausted of a portion of its air content and it may contain an expansible liquid, such as ether, or the like, that will volatilize at a relatively low temperature. It may be inherently expansible or contain a spring, as shown, to expand it. A tube 12 mounted on the wall of the float and extending therein serves as a guide to hold the float in the center of the chamber; it rides on the vertical pin 13 for that purpose. The pin is suitably secured to the bottom wall of the chamber 10 by the nuts 14.

Gasoline indicated at 15 is brought into the chamber 10 thru the pipe 16 and the valve port 17. A needle valve 18 which controls the port is guided in a bearing 19 and is threaded near its upper end, as at 20. The valve stem has a slot 21 in its upper end so that it may be rotated to adjust the nut 22 higher or lower thereon.

Pivoted to the nut 22, as at 23 and 24, is a lever 25 having spaced prongs 26 and 27, thru which the pins 23 and 24 pass, respectively, into the nut. The cover 28 is secured to the top of the float chamber 10 by screws 29. Depending from the underside of the cover are two spaced arms 30 and 31, to and between which the lever 25 is pivoted. On the upper surface of the float 11 are two upwardly extending spaced arms 32 and 33, in which are registering horizontal slots 34, receiving a pivot pin 35 carried in the end of the lever 25.

From the foregoing description it will be noted that as the liquid level rises to a predetermined point in the float chamber and nozzle the float will rise and close the valve port by movement of the valve which will stop the inflow of gasoline into the chamber, and as the liquid level goes down the float will descend and open the valve port allowing more liquid to enter the float chamber and nozzle. The liquid head in the float chamber varies and may be regulated, to some extent, by adjusting the valve stem 21 in the nut 22. For the purpose of adjustment the upper end of the valve stem extends thru an opening 36 in the cover 28 and is enclosed by a removable cap 37 which also closes the opening.

A Venturi tube 38 of the usual type, shown in Fig. 1, is located adjacent the float chamber 10, and in the venturi is a fuel nozzle 39 communicating with the float chamber and having its discharge end near the most restricted part of the tube.

The throttle 40 controls the air passing thru the venturi.

The float in the ordinary type carburetor is made either of a piece of cork, or the like, or it is a rigid metallic sealed hollow vessel, neither of which is to any material extent responsive in any manner to temperature variations.

It is known that the difference in fluid level, due to temperature, is not the sole cause for inefficiency and imperfect working of a cold motor, but it is a contributing factor of considerable importance. It is one of the purposes of this invention to substantially reverse the normal usual conditions by causing a higher fuel level in the float chamber and nozzle when the fuel is cold than when it is hot, thereby not only eliminating the disadvantages to which attention has been directed, but going a little further in the proper direction. In a carburetor of the usual type anything that would tend to cause the float to ride higher in the liquid would shut off the flow of liquid into the float chamber when the liquid is at a lower level than normal. When the liquid is cold it is heavier but the float, in the usual carburetor, does not change its specific gravity to any material extent for its bulk or volume is changed by temperature variations only in proportion to the coefficient of expansion of the material of which it is made which, in any case, is far below that of the liquid within the carburetor and for practical purposes is negligible.

In the present invention the float has elastic side walls 41 which are largely responsive to variations of internal pressure to cause it to expand or contract in an axial direction due to variations of pressure induced by variations of temperature of the enclosed medium, such as air, liquid, or a gaseous fluid, or all, the expansion and contraction of which is much greater than that of the liquid upon which the float is supported, and by which it is affected.

The specific gravity of the float, therefore, varies, in some proportion, to the temperature variations.

The air and gaseous fluid within the float expands by increase of temperature producing increased pressure and causing increased axial dimension of the float body with the result that when the fuel liquid is warm the float will ride higher above the surface of the liquid than when it is cold, thereby causing low liquid level at the nozzle at high temperature and higher liquid level at the nozzle at lower temperature.

When the fuel liquid is hot it is more limpid or mobile and flows more freely than when it is cold. When it is cold it is more viscous, and greater effort is required to raise it from the nozzle Therefore, and for this reason, the level of the liquid in the float-chamber and nozzle should be higher when the liquid is cold and lower when it is hot.

When the compensation for variation of the temperature is thus automatically made, manual change in adjustment of the carburetor during engine starting operation or for speed variation will become practically unnecessary.

Now, referring to the float, it has been seen that it will ride higher under increased temperature. Assume that the temperature has been increased and the fuel head thus automatically established for normal speed of the engine, it will be further advantageous if the liquid level could be made to descend to a still greater extent when the engine speeds up or when the movement of the ingoing air has been accelerated to prevent excess flow of gasoline into the charge.

If the pressure be decreased in the float chamber the dimensions of the float will be increased by the operation of spring 50 as a result of the increased differences of the pressures within the float and that surrounding it. This spring serves to axially extend the float when the exterior pressure has been decreased. Hence, the float will again ride higher than in the first example, and cause the liquid level to go lower than before, thus additionally compensating for speed of the engine, or air velocity.

Having described our invention what we claim as new and desire to secure by Letters Patent, is:—

1. A carburetor comprising a float chamber, an expansible float within the chamber, a spring for expanding the float, a tubular socket member in the float and a pin in the float chamber engaging in the socket.

2. A carburetor comprising a float chamber, an expansible float within the chamber, a tubular socket member in the float, a spring upon the tubular socket member between the walls of the float tending to expand the float and a pin in the float chamber engaging in the socket in the float.

3. A carburetor comprising a float chamber, an expansible float within the chamber, a tubular socket member mounted in the float and communicating with the chamber through the wall of the float, a spring mounted upon the tubular socket member with its ends abutting the walls of the float and a pin mounted in the wall of the chamber to engage in the socket in the float.

4. A carburetor comprising a float chamber, an expansible float within the chamber, a tubular socket member arranged axially within the float and communicating through the wall thereof with the chamber, a spring coiled around the tubular socket member with its respective ends bearing upon the wall of the float to expand said float, and a pin mounted in the wall of the chamber in engagement with the tubular socket member to guide the float.

5. A carburetor comprising a float chamber, an expansible float in the chamber, means within the float for expanding the same and a guide means for said float.

6. A carburetor comprising a float chamber, an expansible float in the chamber, a guide member in said float, an expansible means upon said guide member adapted for expanding the float and means mounted in the chamber engaging the guide means within the float.

7. A carburetor comprising a float chamber, an expansible float in the chamber, a tubular socket member mounted on the wall of the float and extending axially therein, an expansible member upon the tubular socket member adapted to expand the float and a guide pin in the wall of the float chamber engaging in said socket.

8. In a carburetor an expansible float and a spring in the float tending to expand the same.

In testimony whereof we hereunto set our hands.

FREDERICK PURDY.
FORÉE BAIN.